United States Patent [19]
Crocker et al.

[11] 3,810,553
[45] May 14, 1974

[54] PIPE HANDLING DEVICE
[75] Inventors: Roger A. Crocker, Box No. 448, Wickett, Tex. 79788; Jim F. Schoolcraft, Wickett, Tex.
[73] Assignee: said Crocker, by said Schoolcraft
[22] Filed: Aug. 31, 1972
[21] Appl. No.: 285,486

[52] U.S. Cl................................. 214/2.5, 214/1 P
[51] Int. Cl............................................ E21b 19/00
[58] Field of Search......... 214/1 P, 1 PA, 1 PB, 2.5, 214/77 R; 175/85

[56] References Cited
UNITED STATES PATENTS
| 3,494,483 | 2/1970 | Smart | 214/2.5 X |
| 2,900,091 | 8/1959 | Minter | 214/2.5 |
| 3,159,286 | 12/1964 | Freeman, Sr. | 214/2.5 |
| 2,789,707 | 4/1957 | Wolf | 214/77 R |
| 2,335,719 | 11/1943 | Williams | 214/2.5 |
| 3,254,776 | 6/1966 | Brown | 214/2.5 |

Primary Examiner—Frank E. Werner
Attorney, Agent, or Firm—Pravel, Wilson & Matthews

[57] ABSTRACT

Apparatus for handling pipe including a frame having carriage means mounted therewith for receiving and moving a pipe length, lift means for lifting a pipe length from a pipe rack or the like upwardly to an intermediate position from which the pipe length is transferred to the carriage means by a platform arrangement and an inclined chute aligned with the carriage means whereby a pipe length is transferable therebetween.

12 Claims, 9 Drawing Figures

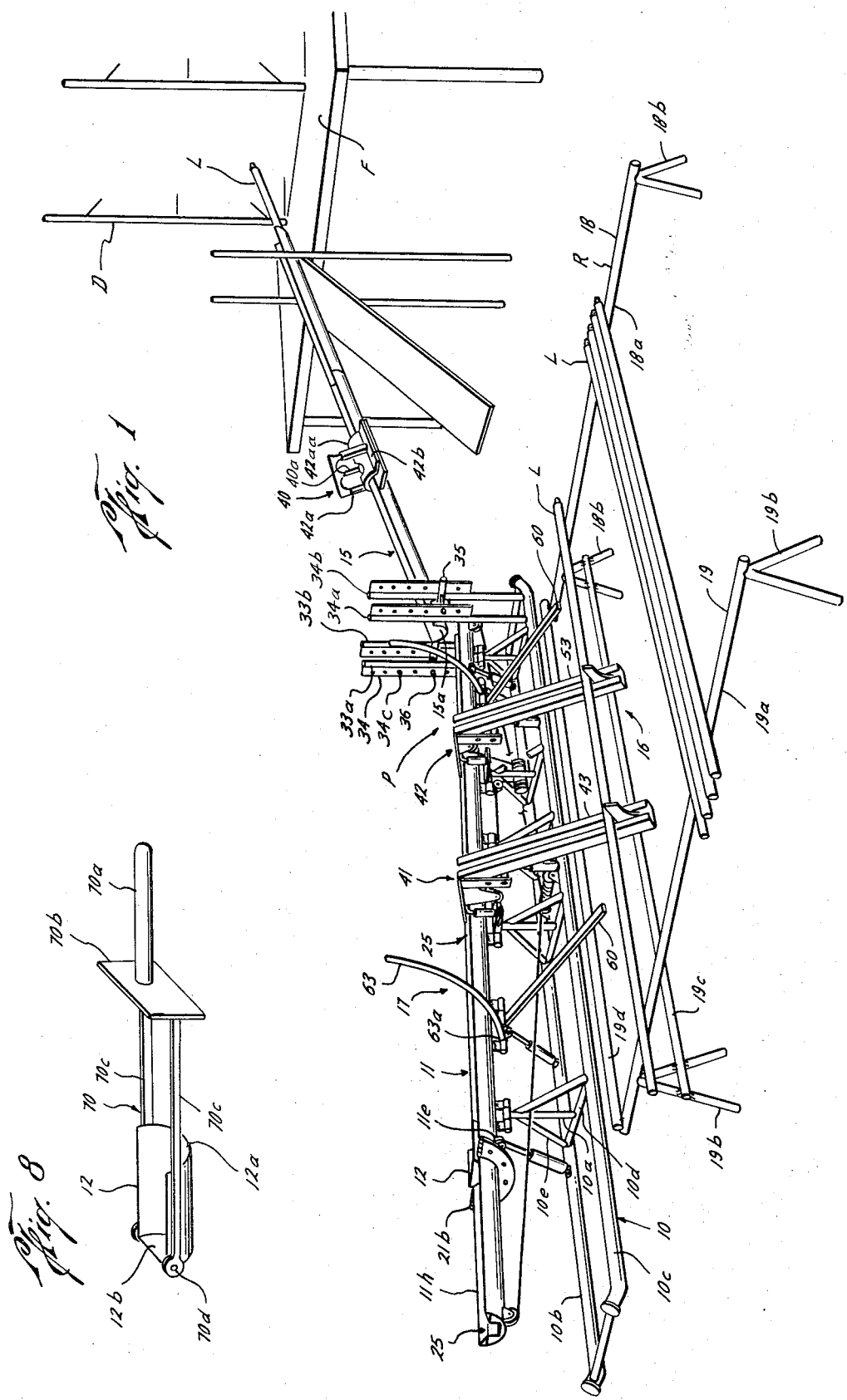

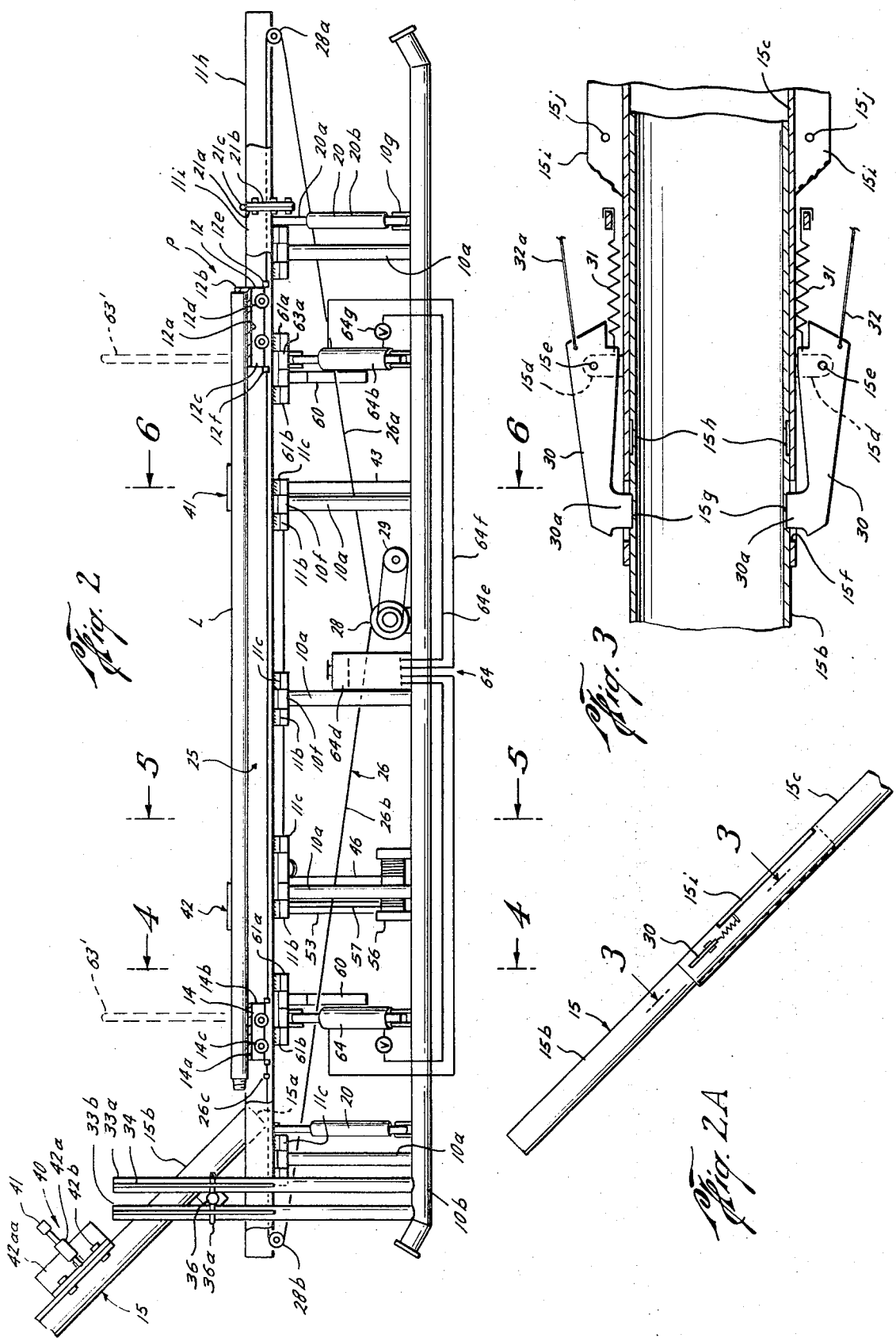

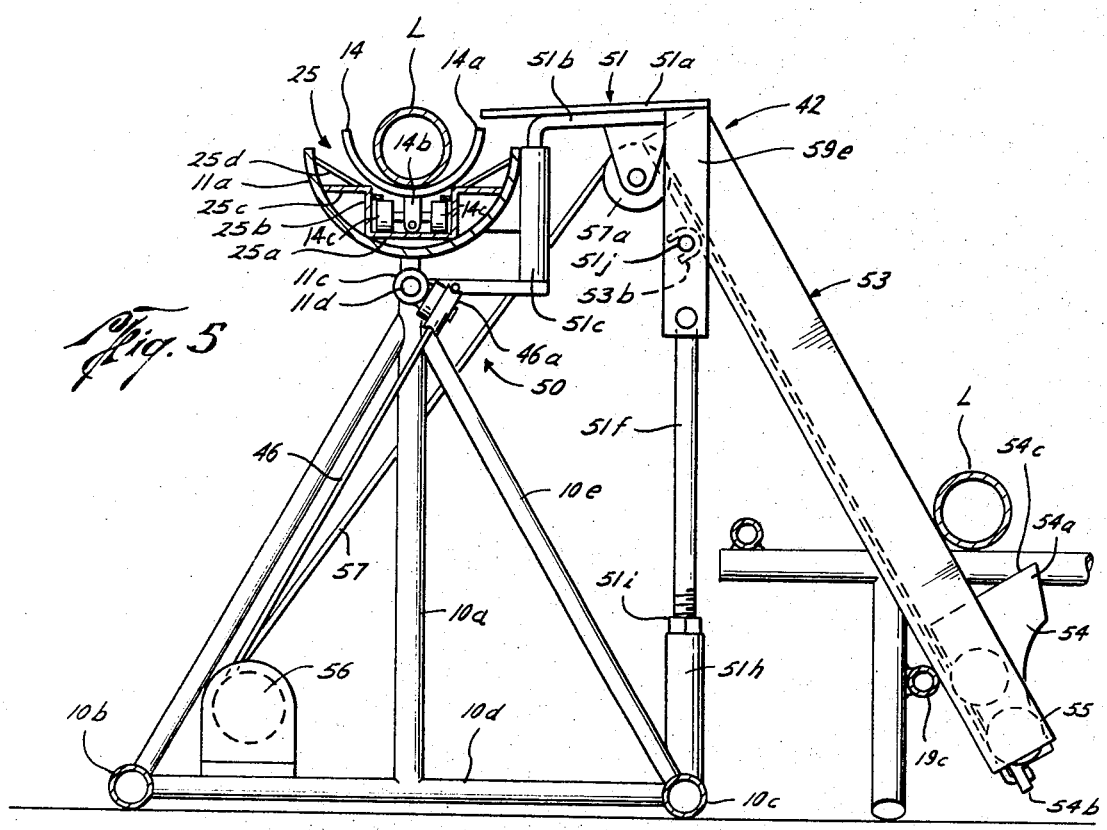
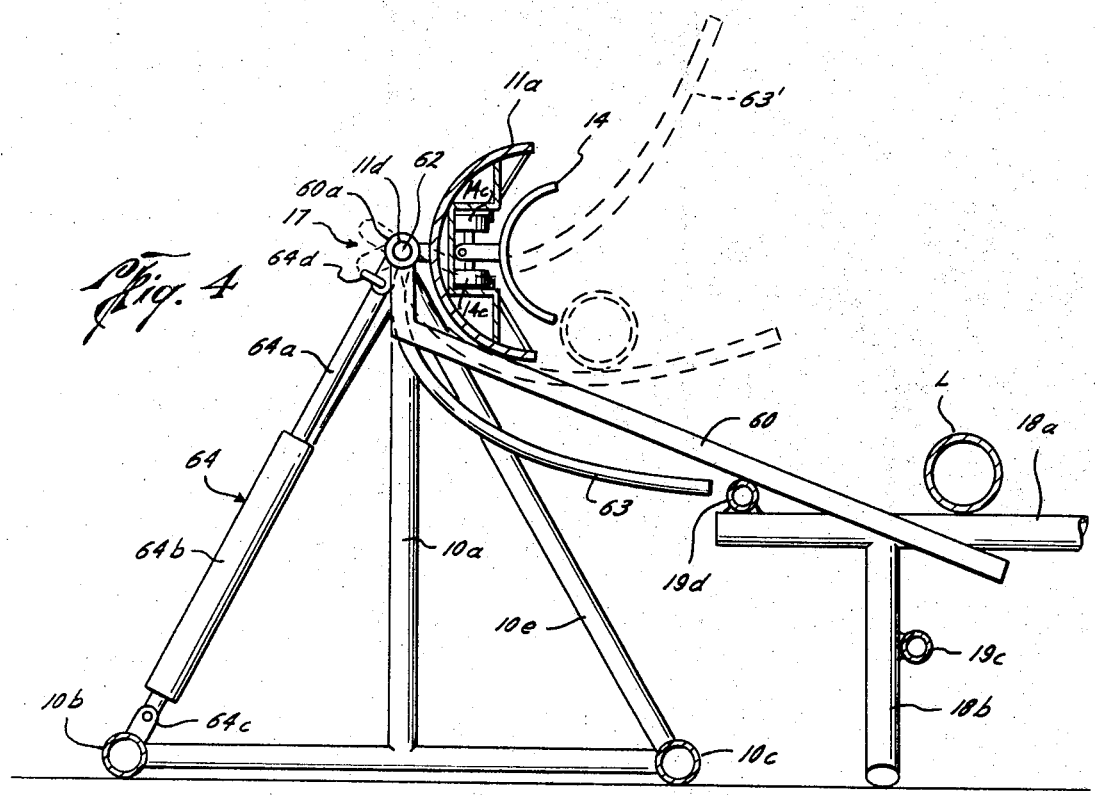

PIPE HANDLING DEVICE

BACKGROUND OF THE INVENTION

The field of this invention is pipe handling apparatus.

The handling of tubular goods, such as the moving of drill pipe between an oil well derrick floor and a pipe rack positioned below the derrick floor presents many problems since drill pipe lengths are quite heavy and dangerous to handle. An example of a machine that attempts to automatically handle such pipe lengths is described in U.S. Pat. No. 3,494,483 issued to Smart.

SUMMARY OF THE INVENTION

This invention relates to a new and improved pipe handling apparatus for moving pipe between the floor of an oil well derrick and pipe rack or the like.

The improved pipe handling apparatus of this invention basically comprises a frame having a carriage means mounted thereon for receiving and moving a pipe length to an inclined chute which is aligned with the carriage means. The pipe length is lifted to the carriage means from a pipe rack or the like by a lift means that includes means for lifting a pipe length upwardly from the pipe rack to an intermediate position where a platform arrangement is positioned to receive and transfer the pipe length onto the carriage means. The lift means of the pipe handling apparatus includes a plurality of lift tracks having cable actuated lift members mounted therein such that coordinated movement of the lifting members will lift a pipe upwardly to the intermediate position from the pipe rack.

The pipe handling apparatus of this invention further includes means for receiving a pipe length descending from the chute and thereafter lowering the pipe length onto a pipe rack or the like. The pipe length receiving and lowering means includes an elongated pivotally mounted pipe support which is adapted to pivot between a support position in which a pipe length is received from the inclined chute and a lateral or discharge position wherein the pipe is discharged from the pipe support onto a pair of resiliently mounted pipe support arms which gradually lower the pipe length onto guide rails which guide the pipe onto the pipe rack.

In another aspect of this invention, the inclined chute that is aligned with the carriage means includes means for adjusting the over-all length thereof and further includes a braking means for controlling the weight of descent of the pipe length down the chute.

BRIEF DESCRIPTION OF THE DRAWINGS

FIG. 1 is an isometric view of the pipe handling apparatus of the preferred embodiment of this invention illustrated in position for transferring pipe between an oil well derrick floor and a pipe rack positioned therebelow;

FIG. 2 is a view in elevation of a pipe handling apparatus;

FIG. 2a is an elevational view further illustrating the telescoping chute;

FIG. 3 is a sectional view taken along line 3—3 of FIG. 2a;

FIG. 4 is a sectional view of the pipe handling apparatus taken along line 4—4 of FIG. 2 illustrating a pipe length being discharged onto the pipe rack;

FIG. 5 is a sectional view taken along line 5—5 of FIG. 2 illustrating the lift means in position to lift a pipe length from the pipe rack;

FIG. 8 is an isometric view of an alternate embodiment of the front dolly of this invention.

DESCRIPTION OF THE PREFERRED EMBODIMENT

Figure 6:
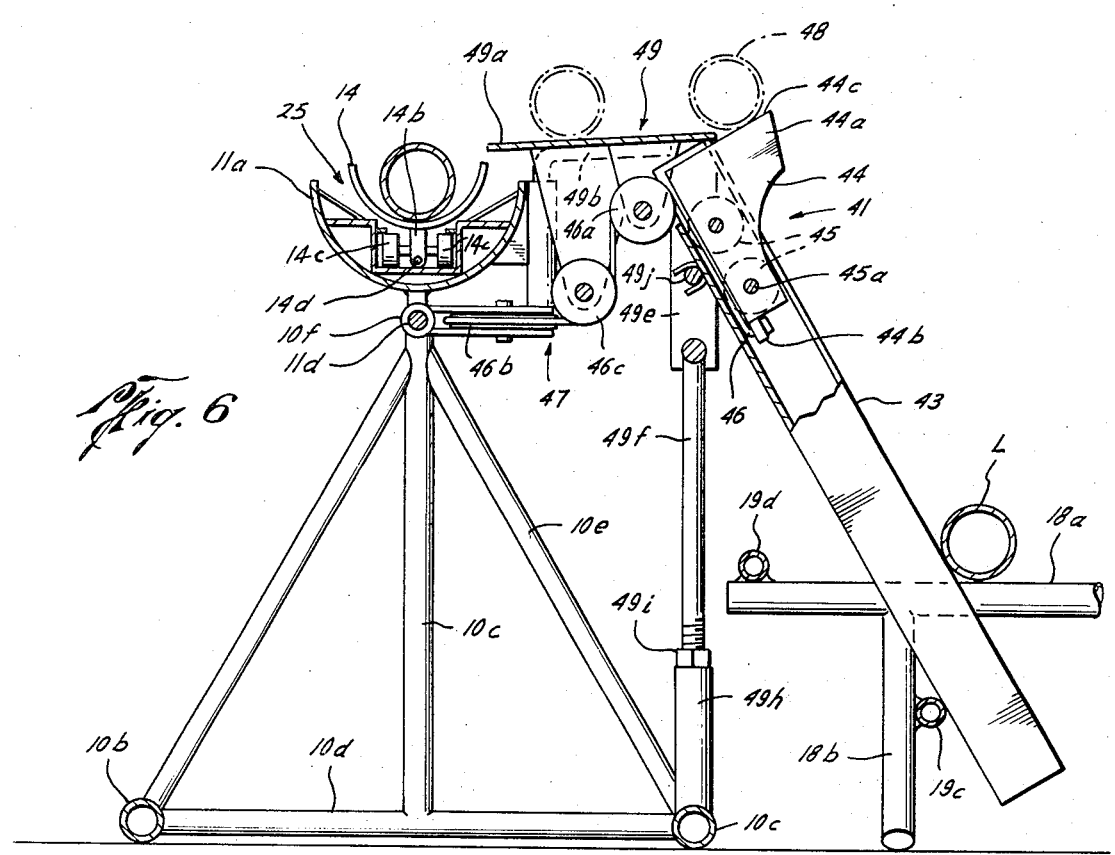
FIG. 6 is a sectional view taken along line 6—6 of FIG. 2 illustrating another lift means having raised a pipe to an intermediate position for transfer to the dollys.

With reference to the drawings, the letter P generally designates the pipe handling apparatus of the preferred embodiment of this invention for transferring a pipe length L between the floor F of an oil well derrick D to a pipe rack R positioned therebelow. Briefly, the pipe handling apparatus P includes a skid frame 10 which supports a carriage means 11 having a front dolly 12 and a rear dolly 14 mounted for movement along the frame 10. An inclined chute 15 is adjustably mounted onto the frame 10 and extends upwardly to the derrick floor F in alignment with the front and rear dollys 12 and 14, respectfully, so that pipe length L can be transferred to and from the derrick floor F.

Lift means generally designated as 16 are mounted onto the carriage means 11 for successively lifting a pipe length L from the pipe rack R upwardly onto the dollys 12 and 14 so that the pipe length can be transferred upwardly onto the chute 15 and the derrick floor F. conversely, lowering means generally designated as 17 are mounted onto the carriage means 11 for successively receiving pipe lengths from the chute 15 and gradually lowering such pipe lengths onto the pipe rack R.

The pipe rack R is of conventional construction and includes spaced uprights generally designated as 18 and 19 which support a plurality of pipe lengths L in a conventional manner. The rack upright 18 includes a pipe support 18a having inclined legs 18b welded or otherwise attached thereto. Similarly, the upright 19 includes pipe support 19a with legs 19b supporting same. A pipe 19c is welded or otherwise attached to the inclined legs 19b and 18b below the support pipe 18a and 19a in order to provide support for the lift means 16, which will be described in more detail hereinafter. And, another pipe 19d is welded or otherwise attached to the tops of the support pipes 18a and 19a at the ends thereof nearest to the frame 10 in order to provide support for the lowering means in a manner to be described hereinafter.

The carriage means 11 includes a semi-cylindrical elongated pipe support or channel 11a which extends the length of the frame 10 and is pivotally mounted thereon. The frame 10 includes a plurality of center posts 10a that are longitudinally spaced along the length of skid pipes 10b and 10c. Each of the center posts 10a is welded or otherwise attached to a horizontal post support 10d which extends between and is attached to the skid pipes 10b and 10c by welding or other suitable means. Inclined post supports 10e are welded or otherwise attached to the center posts 10a and to the base members 10b and 10c in order to reinforce the center posts 10a.

The channel 11, which may be a curved plate or a partial pipe section, has a plurality of hinged sleeve members 11b and 11c attached to the bottom thereof in a spaced relationship so as to be aligned with a corresponding hinge sleeve member 10f attached by welding or other suitable means to each of the center frame posts 10a. A pin 11d extends through the hinge sleeve members 11b and 11c of the channel 11a and through the post hinge member 10f whereby the elongated channel is pivotally mounted onto the skid frame 10 for pivotal movement with respect thereto.

The channel or pipe support 11a is pivoted between an upright or support position (FIG. 5) and a lateral or discharge position (FIG. 4) by means of hydraulic cylinder assemblies 20. Each of the hydraulic assemblies 20 is of conventional construction and includes a hydraulic cylinder 20b pivotally attached to the skid pipe 10b by lugs 10g and a piston and rod 20a pivotally attached to the channel 11a by lugs 11e, which extend from the outside surface thereof. A suitable hydraulic power source (not shown) for the hydraulic cylinders 20 is operably connected therewith.

the pivotal pipe support or channel 11a includes a pivotally mounted front end portion or extension 11h which can be pivoted or folded inwardly in order to shorten the over-all length of the channel 11a for the convenience in transporting same. The main channel section 11i has a semi-annular plate 21a welded or otherwise attached thereto and the end or collapsible section 11h has a semi-annular plate 21b welded or otherwise attached thereto. The plates 21a and 21b are pivotally connected through a hinge 21c such that the front end channel section 11h can be pulled upwardly and over the main channel section 11i whenever desired. When the channel sections 11h and 11i are in the operating position shown in the drawings, bolts may be used to attach the corresponding flange sections or plates 21a and 21b together.

An elongated track generally designated as 25 is formed within the channel 11a. A horizontal, elongated plate 25a is mounted onto the bottom of the channel 11a and elongated upstanding sidewalls 25b cooperate with the bottom plate 25a to form an elongated, U-shaped track 25. The side plates 25b are supported by horizontal plates such as 25c and inclined reinforcing plates such as 25d (FIG. 5).

The rear dolly 14 includes a semi-cylindrical plate 14a having a vertical plate 14b welded or otherwise attached thereto. the vertical plate 14b has a plurality of wheels 14c rollably mounted thereon, the wheels 14c being positioned to mount the rear dolly 14 for movement within the confines of the U-shape track 25. a sleeve section 14d is formed at the bottom of the vertical plate 14b in order to slidably receive a cable generally designated as 26. The front dolly 12 includes a semi-cylindrical portion 12a, which is similar to the semi-cylindrical portion 14a of the rear dolly 14, and an end plate 12b welded or otherwise attached thereto. The end plate 12b and the semi-cylindrical plate 12a cooperate to receive one end of a pipe length L such that the dolly end plate 12b can be used to push the pipe length L rearwardly toward the chute 15. A vertical plate 12c extends downwardly from the semi-cylindrical plate 12a and has a plurality of wheels 12d attached thereto and positioned to mount the front dolly 12 for rolling movement within the confines of the U-shaped track 25. The front dolly 12 is attached to cable 26.

The front dolly 12 and rear dolly 14 are moved along the channel track 25 by means of the cable 26 which is wound and unwound from a conventional reel 28 driven by a motor 29. The cable can be described as having a front portion 26a which is mounted onto the reel 28 and extends through a front end pulley 28a and into fixed attachment at 12e with the front dolly 12. The cable 26 further includes a rear section 26b which is wound onto the reel 28 in the opposite direction from the front cable section 26a. The rear cable section 26b extends around a rear end pulley 28b, into the track 25, through the sleeve portion 14d of the rear dolly 14 and into attachment with the front dolly at 12f. A stop member 26c, which may simply be a knot in the rear cable section 26b, is illustrated in FIG. 2 adjacent the rear dolly 14. The stop member 26c is of a greater diameter than the inside diameter of the sleeve portion 14d of the rear dolly 14 and is used to return the rear dolly to the position of FIG. 2 in a manner to be described hereafter.

The telescoping chute 15 includes an upper semi-cylindrical chute section 15b which is adapted to fit within a lower semi-cylindrical section 15c. The upper chute section 15b is adjustably attached to the lower chute section 15c so that the over-all length of the chute 15 can be adjusted. Referring to FIGS. 2a and 3, two pawls 30 are pivotally mounted onto the lower chute section 15c by means of lugs 15d and pins 15e which extend through the pawls 30 in a conventional manner. Each of the pawls 30 includes a latch or gripping portion 30a which extends inwardly through a hole 15f in the lower chute section 15c, into slots or indentations such as 15q in the outside of the upper chute section 15b. In this manner, the pawls 30 are used to adjustably attach the upper chute section 15b to the lower chute section 15c in such a manner that the overall length of chute 15 can be adjusted simply by aligning a different set of slots, such as 15h with the latch portions 30a of the pawls. The pawls 30, which are resiliently mounted by springs 31, can be operated from a remote point by means of lines such as 32 which can be used to pivot the latch portions 30a out of one slot so that the upper and lower sections of 15a and 15c, respectively can be re-positioned before allowing the latch portions 30a to engage another slot.

The end 15a of the lower chute 15c is adjustably mounted to the frame 10 so that the inclination of the chute 15 can be varied. The vertically extending uprights 33a and 33b are welded or otherwise attached to a base skid member 10b and extend upwardly adjacent the bottom portion 15a of the chute 15. Similarly, upright members 34a and 34b are attached to the base skid member 10c and extend upwardly therefrom. Each of the vertical members such as 33a has attached thereto a plate 34 with a plurality of vertically spaced holes 34c therein. The bottom portion 15a of the chute 15 includes mounting pins 35 and 36 extending from either side thereof. Referring to FIG. 2, the chute 15 is attached to the vertical support members 33a and 33b by extending a cross-pin 36a through aligned holes 34c in the vertical support members and through a hole in the pin 36. In a similar manner, the pin 35 is attached to the vertical support members 34a and 34b. The use of the plurality of holes 34c in attached plates 34 allows the bottom 15a of the chute 15 to be mounted at various heights or elevations such that the inclination of the chute 15 can be readily adjusted. The height of the lower chute end may be adjusted for various other reasons, for example, it has been found desirable to mount the chute 15 such that the bottom 15a thereof extends downwardly into engagement with the track 25 of channel 11a when a pipe length L is being transferred into the chute 15. Conversely, it has been found desirable to mount the bottom 15a of the chute 15 at a slightly higher elevation above the channel 11a when a pipe length is being transferred from the chute to the dollys 12 and 14.

A brake means generally designated as 40 is mounted onto the lower chute section 15c in order to reduce the rate of descent of pipe coming down the chute 15 from the derrick floor F. The brake means, which was described in U.S. Pat. Application Ser. No. 179,502 includes a cylindrical brake pad or shoe (not shown) which is positioned by means of a yoke 40a within the lower chute section 15b in position to engage the top of a descending pipe length L. The yoke 40a includes a central post 41a to which the brake shoe is connected. The yoke 40a is supported on a semi-cylindrical housing section or cover 42aa by hydraulic cylinder assemblies such as 42a. The entire assembly including the cover 42, yoke 40a and brake shoe is mounted onto the lower chute section 15c by bolting cover flange portions 42b to corresponding lower chute flange portions 15i which extend outwardly from either side of the lower chute section 15c. The flange portions 15i include a plurality of holes 15j so that the corresponding flange 42b of the cover 42aa can be mounted at different positions along the chute flange 15i. In this manner, the position of the brake means 40 can be varied with respect to the over-all length of the chute as desired. The hydraulic cylinder assemblies such as 42a can provide a continual pressure which causes the brake shoe to be continually urged aginst the upper surface of a pipe length L descending the chute 15.

Figure 7:
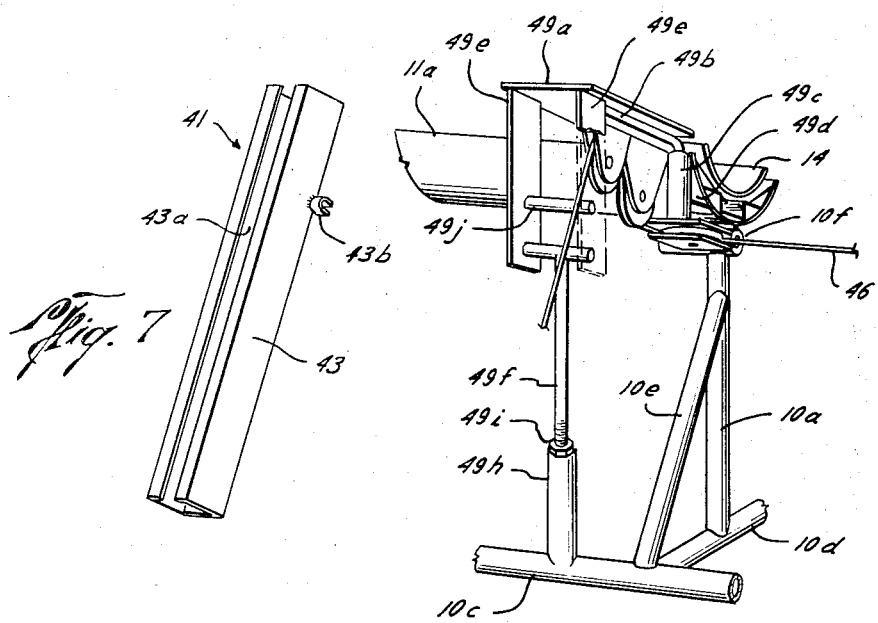
FIG. 7 is an isometric view of the lift means of FIG. 6 illustrating the assembly thereof.

The lift means generally designated as 16 includes a front lift assembly 41 (FIGS. 1, 2, 6 and 7) and a rear lift assembly 42 (FIGS. 1, 2 and 5) which cooperate to successively lift pipe lengths L upwardly onto the dollys 12 and 14.

The front lift assembly includes a square, tubular, elongated housing 43 having an elongated opening or track 43a therein. A lifting element 44 is mounted for movement within the housing 43 and includes a lifting portion 44a which extends outwardly through the opening 43a. The lifting element 44 is mounted for movement within the housing 43 by means of wheels 45 which are mounted for rotation on the lifting element by any suitable means such as shafts 45a such that the wheels 45 are positioned to rollingly engage the inside of the housing 43. The lifting element 44 is attached to a cable 46 through eyelet 44b, the cable 46 being part of a winch/pulley system generally designated as 47 which simultaneously moves or operates both lifting assemblies 41 and 42. Since the winch/pulley system 47 operates both lifting assemblies 41 and 42, a complete discussion of the system will be postponed until both lifting assemblies are adequately described. The lifting element 44 is raised from a position below the support 18a of the pipe rack R upwardly with a pipe length L positioned thereon to an intermediate, elevated position generally designated as 48 from which the pipe length L rolls down a platform assembly 49 into the dollys 12 and 14.

The front platform assembly 49 includes a plate 49a that is mounted onto the frame 10 and pipe support or channel 11a at a slight angle of inclination with respect to the horizontal. The plate 49a is welded or otherwise attached to L-shaped rods 49b which are adapted to be slidably mounted within mounting sleeves 49c that are welded or otherwise attached to the channel 11a by any suitable means such as gussets 49d. The plate 49a is supported by two downwardly extending vertical plates 49e which are attached to the bottom of the plates. A T-shaped support rod 49f is threadedly mounted onto frame side support 49h by means of a nut 49i. The side support 49h extends upwardly from side base member or rail 10c of the frame 10. A bar 49j is attached to and extends between the plates 49e for receiving the elongated housing 43. A curved channel member 43b is welded or otherwise attached to the back of the housing 43 and adapted to fit over the bar 49j such that the housing 43 can be secured in an inclined position and with the lower portion thereof resting on support 19c.

It is to be noted that the lifting element 44 holds or contains the pipe length L as the lifting element moves upwardly to the intermediate position 48 by means of inclined top surface 44c, which cooperates with the housing 43 to hold the pipe length L during lifting. The height of the platform assembly 49 can be adjusted by adjusting the height of the T-shaped support 49f, which is accomplished by adjusting the position of the nut 49i in a suitable manner.

The rear lift assembly 42 is spaced from the front lift assembly 41 and is basically similar to the front lift assembly 41. A lifting element 54 is mounted for movement within an elongated tubular housing 53, the lifting element 54 including a lifting portion 54a having inclined top surface 54c which contains a pipe length L against the elongated housing 53 as the pipe length L is lifted upwardly. The lifting element 54 is mounted for movement upwardly and downwardly of the housing 53 by means of wheels 55. After a pipe length L has been moved upwardly to a position aligned with the intermediate position 48 indicated in FIG. 6, a pipe length L rolls downwardly along the rear platform assembly 51 (and front platform assembly 49) into the dollys 12 and 14. It is understood that the movement of the lifting elements 44 and 54 are coordinated by pulley means 47 so that the pipe length L is maintained in a substantially horizontal position as it is moved upwardly to the intermediate position 48 so that rolling movement across the platform assemblies 51 and 49 is quite smooth.

The rear platform assembly 51 is basically identical to the front platform assembly 49 and includes an inclined plate 51a which is supported at an angle of inclination by L-shaped supporting rods 51b which extend into mounting sleeves 51c. The inclined plate is further supported by a T-shaped support 51f which is adjustably mounted within a side frame support 51h by nut 51i. The T-shaped support 51f is attached to downwardly extending side plates 59e which are attached to the bottom of the inclined plate 51a. A mounting bar 51j is also attached to the side plates 51 in order to receive the U-shaped mounting sleeve 53c that is welded or otherwise attached to the back side of the housing 53. Housing 53 rests upon the support 19c as well as upon the bar 51*j* at an angle of inclination with respect to the vertical lift. However, it should be understood that the angle of inclination can be adjusted simply by adjusting the position of rest support 19*c*; further, that the rest support 19 can be part of the frame 10, instead of the rack R.

The pulley system 47 for the front lift means 41 and the rear lift means 42 is driven by winch reel 56 which is rotated by a suitable power source (not shown). The cable 46, which is attached to the lifting element 44, is wound onto the reel 56 in such a manner that counterclockwise rotation of the reel will cause the lifting element 44 to be raised upwardly. The cable 46 is drivingly connected between the reel 56 and the lifting element 44 by a series of pulleys 46*a*, 46*b*, 46*c* and 46*d* which are mounted onto the frame 10 and the platform plate 49*a* in order to raise and lower the lifting element 44. Similarly, a cable 57 is wound about the reel 56 and extends through a pulley 57*a*, which is attached to the platform plate 51, into an eyelet connection 54*b* with the lifting element 54. the utilization of the same reel for both cables 46 and 57 insures that the upward and downward movement of the lifting elements 44 and 54 is coordinated such that a pipe length L will be maintained horizontal as it is moved from the pipe rack R upward to the intermediate position 48, wherefrom the pipe length L rolls over the platform plates 49*a* and 51*a* and into the dollys 12 and 14.

The lowering means 17 of the preferred embodiment of this invention is basically identical to the lowering apparatus described in the U.S. patent application to Crocker, Ser. No. 179,502. A pair of spaced guide rails 60 are mounted for independent pivotal movement with respect to the pivotal pipe support or channel 11*a*. The channel 11*a* has mounting sleeves 61*a* and 61*b* welded or otherwise attached to the bottom thereof and the guide rails 60 have a similar mounting sleeve 60*a* which may be aligned with the channel sleeves 61*a* and 61*b* to receive a pin 62. The guide rails 60 are supported at their lower end on the pipe rest 19*d*.

A pair of curved pipe support arms 63 are also mounted onto the bottom of the channel 11*a* for independent pivotal movement with respect to the channel. The curved pipe support arms include a sleeve portion 63*a* which is adapted to be aligned with the sleeves 61*a* and 61*b* in order to receive the pin 62 whereby the pivotal pipe support arms 63 are mounted adjacent to the guide rails 60. The pivotal pipe support arms 63 are operably connected to a closed hydraulic system generally designated as 64 such that the pipe support arms 63 are lowered from a raised position at 63' to the lower, unloading position shown in solid lines in FIG. 4 under the weight of a pipe length L. Thereafter, the hydraulic system 64 operates to return the arms 63 to the raised position 63'. Each of the arms 63 are pivotally connected to a piston rod 64*a* which is drivingly housed in a hydraulic cylinder 64*b*. The hydraulic cylinder 64*b* is pivotally attached to the rail 10*b* of the frame at the lug and pin connection 64*c* and the piston rod 64*a* is pivotally releasably connected to the arm 63 at 64*d*. The hydraulic cylinders 64*b* are double-acting and are connected to a central hydraulic fluid source 64*d* by flow lines such as 64*e* and 64*f*. A valve 64*g* is mounted in the return flow lines 64*e* in order to control the flow of fluid through the line into the tank as the pivotal arm is lowered under the weight of a pipe length L. Nitrogen gas is trapped within the tank 64*d* to provide for the return of the pivotal support arms 63 to the position 63' after a pipe length L has rolled from the support arm 63 onto the guide rails 60.

Thus, after the pivotal pipe support or channel 11*a* has been pivoted to the discharge position illustrated in FIG. 4, a pipe link L rolls out of the trolleys 12 and 14 and onto the pivotal support arms 63. As the weight of the pipe length L causes the pivotal support arms to lower down to a position at the level of the guide rails 60, the nitrogen gas in the central tank is compressed by the additional hydraulic fluid flowing into the tank 64*d*; and after the pipe length L has rolled onto the guide 60 from the pivotal support arms 63, the compressed nitrogen gas in the tank 64*d* will expand thus returning through hydraulic lines 64*f* to cause the pivotal support arms 63 to be raised again to the position 64'. Of course, after the pipe length has rolled onto the guide rails 60, the pipe length L continues downwardly and comes to rest on the rack R.

In operation and use of the pipe handling apparatus P of this invention for raising pipe lengths L upwardly from the pipe rack R to the derrick floor F, the pivotal support arms 63 are removed from pivotal connections 64*d* with piston rods 64*a* so that the arms 63 can be lowered to a position out of interference with the travel of a pipe length L up the lifting assemblies 41 and 42. The chute 15 is adjusted to the position of FIG. 2 and the brake means 40 is removed. With the lifting assemblies 41 and 42 mounted with the platform assemblies 49 and 51, respectively, reel 56 is operated to move the lifting elements 44 and 54 downwardly to the position of lifting element 54 in FIG. 5. Operators then place a pipe length L adjacent the tubular, elongated housings 43 and 53 and the lifting elements 44 and 54 are raised simultaneously by rotation of the winch reel 56 counterclockwise. The winch reel 56 is rotated until the lifting elements 44 and 54 have reached a position of lifting element 44 in FIG. 6 in which pipe length L is in the intermediate position 48.

The pipe length L then rolls freely down the inclined plates 49*a* and 51*a* onto the dollys 12 and 14 which are spaced apart as illustrated in FIG. 2. Referring to FIG. 2, the winch reel 28 is then activated to rotate clockwise to cause the dollys 12 and 14 to proceed rearwardly toward the chute 15. Of course, the stop plate 12*b* of the front dolly 12 pushes the end of the pipe length L rearwardly. The rear end of the pipe length L supported on dolly 14, engages the chute 15 and is subsequently pushed upwardly by the continued rearward movement of the front dolly 12. As the pipe length L continues to be pushed upwardly in the chute 15 due to the continued rearward movement of the front dolly 12, the rear dolly 14 remains approximately adjacent to the lower end 15*a* of the chute 15, the rear dolly no longer supporting the pipe length L. The front dolly 12 continues to move rearwardly until it reaches a position substantially adjacent to the rear dolly 14, at which time operators remove the raised pipe length from the chute 15; thereafter, the reel 28 is rotated counterclockwise until the front dolly 12 returns to the position of FIG. 2. The rear dolly 14 is automatically returned to the position of FIG. 2 by the stop member 26*c* on the rear cable portion 26*b* which engages the sleeve 14*b* of the rear dolly and causes the rear dolly to move therewith.

Whenever desired, such as when a pipe length L is somewhat shorter than usual, a booster generally designated as 70 may be attached to the front dolly 12. The booster 70 is illustrated in FIG. 8 and includes a nose rod 70a welded or otherwise attached to plate 70b. The plate 70b is pivotally mounted by arms 70c to the dolly 12 with a pin 70d extending across back plate 12b. When the booster 70 is utilized, the nose 70a is inserted into the pipe length L; and, as the front dolly 12 with the booster 70 thereon is moved rearwardly with a pipe length L, the nose 70a will pivot and allow the pipe length L to be lifted upwardly to a greater height than if the dolly 12 were used alone. This lifting procedure can be repeated until as many pipe lengths L as desired have been lifted from the pipe rack R upwardly to the derrick floor F.

whenever it is desired to lower pipe down the chute 15 and onto pipe rack R, the lifting assemblies 41 and 42 are removed. First, the tubular housings 43 and 53 are removed from connection to bars 49j and 51j, respectively. Then, the T-shaped supports 49f and 51f are loosened from connection with frame supports 49h and 51h such that the platform plates 49a and 51a can be pulled outwardly of the mounting sleeves 49c and 51c. The platform assemblies 49 and 51 are then lowered to the ground or other suitable location, with the cables 46 and 57 being wound out from the winch reel 56.

The lower end 15a of the pipe chute 15 is then raised to the position of FIG. 1 from the position of FIG. 2; and, the brake means 40 is bolted to the chute 15. The reel 28 is rotated clockwise to move the front dolly 12 into alignment with the pipe chute 15 so as to receive the end of a pipe length L coming down the chute. The rate of descent of the pipe length L coming down the chute will be reduced by application of the brake means 40. After the lower end of the pipe length L has come to rest against the front dolly 12, the reel 28 is then rotated counterclockwise to move the front dolly back to its original postion as illustrated in FIG. 2. The rear dolly 14 serves to catch the rear end of the pipe length L as it leaves the chute.

The hydraulic cylinder assemblies 20 are then activated to pivot the pivotal pipe support or channel 11a from the upright position to the discharge position illustrated in FIG. 4. In such discharge position, the pipe length L rolls out of the dollys 12 and 14 and onto the pivotal arm supports 63. The pivotal arm supports 63 are gradually lowered downwardly to the guide rails 60 in such a manner that the pipe length L rolls out of the pivotal support arms 63 and onto the guide rails 60 and finally onto the pipe rack R. The compressed nitrogen in the central tank 64d expands to return the pivotal arm supports 63 to the upright position designated as 63'.

It should be understood that although the pipe lowering means 17 and pipe lift means 16 have been disclosed as being positioned on the same side of the pipe handling apparatus P, that it is within the scope of this invention to mount one of such assemblies on the other side thereof if so desired. It should be further understood that the pipe handling apparatus P of the preferred embodiment of this invention can be used to transfer any elongated or rod-like members between various locations. For example, the pipe handling apparatus P may be used with or without the chute 15 depending upon whether it is desired to move the pipe to a different level.

The foregoing disclosure and description of the invention are illustrative and explanatory thereof, and various changes in the size, shape, and materials as well as in the details of the illustrated construction may be made without departing from the spirit of the invention.

We claim:

1. Apparatus for handling pipe, comprising:
   a frame;
   carriage means mounted on said frame for receiving and moving a pipe length;
   said carriage means including a pivotal pipe support adapted to be pivoted from a support position supporting said pipe length to a discharge position for laterally discharging said pipe length therefrom;
   lift means including a pipe lifting member for lifting a pipe length from a pipe rack or the like upwardly to an elevated position for discharging said pipe length onto said pipe support of said carriage means for transfer thereto; and
   means for supporting said lift means with its upper end adjacent said carriage means for transferring a pipe length from said elevated position with said lift means to said carriage means; and
   pipe lowering means separate from said lifting means for receiving a pipe length discharged from said pivoted pipe support upon a pivoting of said pipe support from said support position to said discharge position.

2. The structure set forth in claim 1, wherein said lift means includes:
   a lift track positioned adjacent said pipe rack or the like; and
   a pipe lifting member mounted for movement in said lift track, said lifting member being adapted to hold a pipe length for lifting from said rack or the like to said elevated position.

3. The structure set forth in claim 2, including: motor means mounted with said frame and attached to said lifting element for raising said lifting element with a pipe length thereon upwardly from said rack or the like to said elevated position.

4. The structure set forth in claim 2, including:
   said pipe lifting member having wheels means mounted thereon for moving said lifting member upwardly on said track.

5. The structure set forth in claim 1, wherein said platform means includes:
   a platform positioned between said lift means and said carriage means on an incline whereby a pipe length rolls from said elevated position onto said carriage means.

6. The structure set forth in claim 1, including:
   an inclined elongated chute aligned with said carriage means such that a pipe length is transferable between said carriage means and said chute.

7. The structure set forth in claim 6, wherein said chute includes:
   an upper chute section;
   a lower chute section attached to said upper chute portion; and
   means for adjusting the combined length of said attached upper and lower chute sections.

8. The structure set forth in claim 6 including:
   brake means in said chute for engaging the upper surface of a pipe sliding downwardly in said chute to control the rate of descent of the pipe to said carriage means.

9. The structure set forth in claim 6, including height adjusting means mounted with said lower chute section for adjusting the position of said chute relative to said carriage means.

10. The structure set forth in claim 1, wherein:
said pipe lowering means includes a pair of lateral pipe support arms mounted in proximity to said support for receiving a pipe length discharged from said support; and
arm pivoting means pivotally mounting said arms for pivotal movement from a raised pipe receiving position to a lowered pipe discharge position wherein the pipe is discharged therefrom onto a pipe rack or the like.

11. The structure set forth in claim 1, wherein said carriage means includes:
a pair of pipe dollys mounted on said frame for longitudinal movement along said frame, said dollys being adapted to receive a pipe.

12. The structure set forth in claim 11, including:
an inclined elongated chute extending from said carriage means upwardly to a derrick one of said dollys including means for supporting the end of said pipe remote from said chute but movable relative to said one dolly for supporting said end of the pipe as it is pushed up the chute.

* * * * *